H. C. CASS.
BOOT-TREE.
No. 176,165.  Patented April 18, 1876.
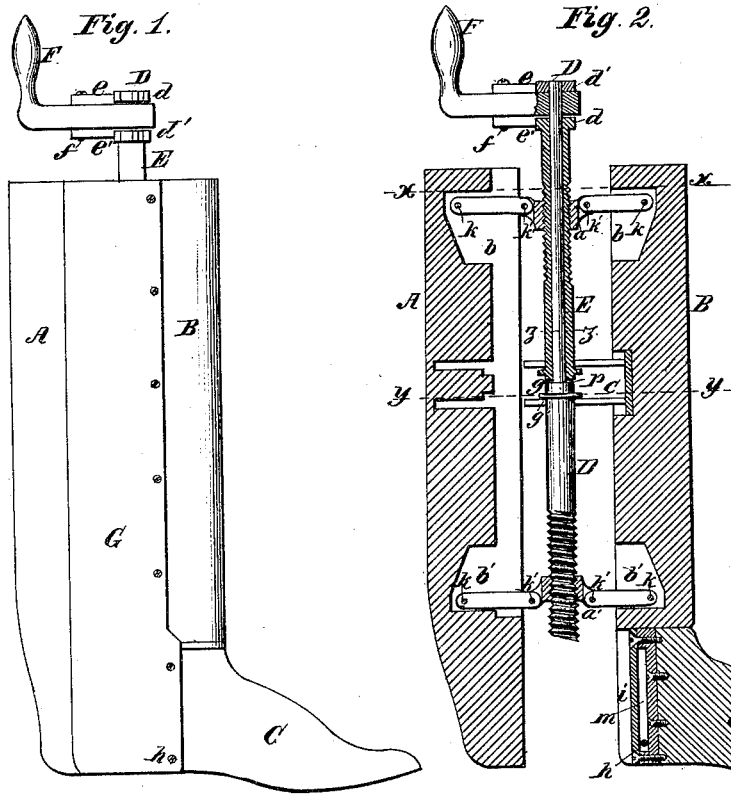
Witnesses.
Joseph B Cass
Chas D Kinney
Inventor.
Henry Clay Cass

UNITED STATES PATENT OFFICE.

HENRY C. CASS, OF CHICAGO, ILLINOIS.

IMPROVEMENT IN BOOT-TREES.

Specification forming part of Letters Patent No. 176,165, dated April 18, 1876; application filed March 16, 1876.

*To all whom it may concern:*

Be it known that I, HENRY CLAY CASS, of the city of Chicago, in the county of Cook and State of Illinois, have invented certain new and useful Improvements in Boot-Trees; and I do hereby declare that the following is a full, clear, and exact description thereof, that will enable others skilled in the art to which it belongs to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claims.

Figure 1 is a side view. Fig. 2 shows a vertical section, and Fig. 3 a horizontal section, of my boot-tree, taken through the line $x\ x$. Fig. 4 is a horizontal section taken through the line $y\ y$. Fig. 5 is an end view of the top of tree when closed. Fig. 6 is a top view of the handle F detached from tree. Fig. 7 is a side view of the nut $a'$, with the arms or links $b'\ b'$, one of which is detached from the nut $a'$. This figure also shows one of the pins $k$. Fig. 8 is a horizontal section of the rod D and the sleeve E, taken through the line $z\ z$. Fig. 9 is one of the dogs $e\ e'$, both of which are alike. Fig. 10 is the set-rings $d\ d'$, which are provided with teeth or lugs, as shown, also with pins or set-screws $s\ s'$, for firmly fastening them upon the rod D and sleeve E, respectively, the ring $d'$ belonging upon the rod D and the ring $d$ upon the sleeve or hollow rod E, as shown.

A is the rear part of the leg, and B the front part. G G' are the flanges, which are screwed to the front B, and serve to entirely cover the spaces caused by the separation of A and B, as will be hereafter shown. C is the foot, provided with an elongated slot, $m$, in its rear. In this slot the screw $h$ plays. D is a rod, which reaches from the top of the handle F to the point where the movable foot is connected with the tree. From the point $p$, Fig. 2, to the top of handle rod D is reduced in size sufficiently to receive the hollow rod or sleeve E, and is furnished with a collar, $g'$, which plays on the guide $c$, as shown. It is provided with a left-hand screw at its lower end, and at its upper end is furnished with the set-ring $d'$, fastened by means of the small set-screw $s$. E is a hollow rod or sleeve, which extends from the bottom of the handle F to the point $p$, where the lower end of E rests upon the shoulder on rod D, caused by reducing its size, as aforesaid. The sleeve E is furnished with a collar, $g$, which plays upon the guide $c$, similar to rod D, and is provided with a right-hand screw upon its upper portion, and at its upper end is furnished with the set-ring $d$, fastened to it by means of the small set-screw $s'$, as shown. $c$ is the guide, which is attached to front of tree B, and which is supported in slots in A. The guide $c$ is supplied with elongated slots, in which the rod D and sleeve E play, and serves, together with the collars $g\ g'$, to keep the rod D and sleeve E in the same relative position, as shown. The nut $a$ is furnished with arms or links $b\ b$, and is moved by the screw upon the sleeve E. The nut $a'$ is made in a similar manner, is furnished with arms or links $b'\ b'$, and is moved by the screw upon rod D. The arms or links $b\ b$ and $b'\ b'$ are secured in the back A and front B by means of pins $k$, and are fastened to nuts $a$ and $a'$ by means of rivets $k'$, as shown. The handle F is furnished with the dogs $e\ e'$, secured to it by means of the screw $f$, and turns loosely upon the rod D, as shown, save when the dogs $e\ e'$ are so placed as to engage the lugs or teeth upon the rings $d\ d'$, as shown.

By placing the dogs $e\ e'$ so as to engage the teeth or lugs upon the set-rings $d\ d'$, which are firmly fastened to the sleeve E and rod D, respectively, as aforesaid, and turning the handle F to the right, the nuts $a\ a'$ are moved from each other and toward the ends of the tree, and by means of the arms $b\ b$ and $b'\ b'$, secured to the back A and front B, as aforesaid, separate the parts A and B until the arms or links $b\ b$ and $b'\ b'$, respectively, stand at a right angle with the rod D and sleeve E. Then the boot-tree has reached its utmost capacity in stretching the boot-leg. By placing the dogs $e\ e'$ so as to engage the teeth or lugs upon the rings $d\ d'$, and turning the handle F to the left, the action is reversed, and the nuts $a\ a'$ approach each other, and the parts A and B are brought together again; and, by placing the dog $e$ so that it shall engage the teeth or lugs upon the set-ring $d'$, and allowing the dog $e'$ to remain free from the lugs or ring $d$, and turning the handle F to the right, the rod D is turned, while the sleeve E remains stationary, and the tree is extended only at the bottom by means of nut $a'$ and the arms or links $b'\ b'$; or, by placing the dog $e'$ so that it shall engage the teeth or lugs upon set ring $d$, and allowing dog $e$ to remain free from teeth or lugs on ring $d'$, and turning handle F to the right, the sleeve E is turned, and, by means of nut $a$ and arms or links $b\ b$, the parts A and B are separated at the top, while remaining stationary at the bottom; or, by placing either one or both of the dogs $e\ e'$ so that they shall engage lugs on set-rings $d'\ d$, respectively, and turning the handle F to the left, the action is reversed, and the tree may be closed at top or bottom, either separately or simultaneously. Thus the tree may, by means of the rod D and sleeve E, with their respective toothed or lugged set-rings $d'\ d$, and the nuts $a\ a'$ and the links $b\ b$ and $b'\ b'$, and the handle F, with its separate and independent dogs $e\ e'$, be either extended or contracted at either top or bottom, separately or simultaneously, at pleasure, thus enabling the operator to perfectly tree the boot at any point desired.

The foot C may be removed at pleasure, and replaced by one of larger or smaller size, so that the foot may be enlarged more or less, as desired.

Having now fully described my invention, what I claim, and desire to secure by Letters Patent, is—

1. In a boot-tree, the rod D, provided with a left-hand screw, and furnished with the hollow rod or sleeve E, which is provided with a right-hand screw, in combination with the set-rings $d\ d$, the collars $g\ g'$, and the fixed guide $c$, substantially as shown and described.

2. The handle F, in combination with the dogs $e\ e'$, the set-rings $d\ d'$, and the rod D and sleeve E, as shown and described.

3. In a boot-tree, the nuts $a\ a'$, provided with the arms or links $b\ b\ b'\ b'$, in combination with the rod D, sleeve E, guide $c$, and parts A B, substantially as shown and described.

In testimony that I claim the foregoing I have hereunto set my hand this 13th day of March, A. D. 1876.

HENRY CLAY CASS.

Witnesses:
JOSEPH B. CASS,
WILLIAM E. MERIGOLD.